United States Patent
Kim (10) Patent No.: US 11,549,961 B2
(45) Date of Patent: Jan. 10, 2023

(54) IMPACT DETECTION SYSTEM FOR VEHICLE AND IMPACT DETECTION SYSTEM METHOD THEREFOR

(71) Applicants: HYUNDAI MOTOR COMPANY, Seoul (KR); KIA MOTORS CORPORATION, Seoul (KR)

(72) Inventor: Kyoung Jun Kim, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/774,562

(22) Filed: Jan. 28, 2020

(65) Prior Publication Data
US 2021/0048449 A1 Feb. 18, 2021

(30) Foreign Application Priority Data
Aug. 13, 2019 (KR) .................. 10-2019-0098655

(51) Int. Cl.
*G01P 15/18* (2013.01)
(52) U.S. Cl.
CPC .................. *G01P 15/18* (2013.01)
(58) Field of Classification Search
CPC ...... G01P 15/18; G01P 15/04; G01P 15/0891; B60R 21/01334; B60R 21/0132; B60R 2021/01204; G01M 17/0078
See application file for complete search history.

(56) References Cited

U.S. PATENT DOCUMENTS

| | | | | |
|---|---|---|---|---|
| 6,561,301 B1* | 5/2003 | Hattori | ........... | B60R 21/0136 180/274 |
| 10,853,882 B1* | 12/2020 | Leise | ........... | G06V 20/46 |
| 2002/0013686 A1* | 1/2002 | Bellora | ........... | B60R 21/04 703/8 |
| 2006/0102413 A1* | 5/2006 | Ootani | ........... | B60R 21/0136 180/274 |
| 2007/0075919 A1* | 4/2007 | Breed | ........... | B60R 21/0132 345/8 |
| 2009/0099734 A1* | 4/2009 | Le | ........... | B60R 21/0132 701/46 |
| 2021/0295441 A1* | 9/2021 | Mullen | ........... | G08G 1/04 |

* cited by examiner

*Primary Examiner* — Eyob Hagos
(74) *Attorney, Agent, or Firm* — Morgan, Lewis & Bockius LLP (57) ABSTRACT

An impact detection system for a vehicle and an impact detection method therefore are provided. The impact detection system includes an impact value calculator that determines an impact value corresponding to a magnitude of an impact applied to a vehicle, an impact location estimator that estimates a location to which the impact is applied in the vehicle and generates an impact location signal including a parameter value corresponding to the estimated location, and an effective impact determining device that compares the impact value with an impact detection reference value for each location of the vehicle, corresponding to the parameter value.

7 Claims, 5 Drawing Sheets

IMPACT DETECTION SYSTEM FOR VEHICLE AND IMPACT DETECTION SYSTEM METHOD THEREFOR

CROSS-REFERENCE TO RELATED APPLICATION

The present application claims priority to Korean Patent Application No. 10-2019-0098655, filed on Aug. 13, 2019, the entire contents of which is incorporated herein for all purposes by this reference.

BACKGROUND OF THE INVENTION

Field of the Invention

The present invention relates to an impact detection system for a vehicle and an impact detection method therefor.

Description of Related Art

In general, a vehicle is provided with a device for detecting an impact when the impact is applied to the vehicle to protect people who ride in the vehicle or record accident scenes of the vehicle.

Such an impact detection device may compare an impact value of an impact applied to the vehicle with a reference value to determine whether the impact is an effective impact.

However, due to a distance between a location of a sensor for impact detection, mounted in the vehicle, and a location to which a real impact is applied or due to a physical feature difference between materials forming the vehicle, although there are impacts with the same strength, strength of the impact recognized by the sensor may vary with locations of the impacts.

However, a conventional impact detection device does not reflect such a difference to be unable to accurately detect the impact applied to the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an impact detection system for differentially applying an impact detection reference value corresponding to a location of an impact depending on the location of the impact applied to a vehicle and optimizing a detection deviation according to the location of the impact to more accurately determine the validity of the impact applied to the vehicle.

The technical problems to be solved by the present inventive concept are not limited to the aforementioned problems, and any other technical problems not mentioned herein will be clearly understood from the following description by those skilled in the art to which an exemplary embodiment of the present invention pertains.

According to various aspects of the present invention, an impact detection system for a vehicle may include: an impact value calculator that determines an impact value corresponding to a magnitude of an impact applied to the vehicle, an impact location estimator that estimates a location to which the impact is applied in the vehicle and generates an impact location signal including a parameter value corresponding to the estimated impact location, and an effective impact determining device that compares the impact value with an impact detection reference value for each location of the vehicle, the impact detection reference value corresponding to the parameter value.

The impact value calculator may include an accelerometer that detects acceleration perpendicular to the impact applied to the vehicle and generates acceleration signals and a signal processor that determines and output a vector sum of the acceleration signals as the impact value.

The impact location estimator may detect an impact direction corresponding to a maximum impact force point on a three-dimensional (3D) coordinate system for the acceleration signals and may estimate the location of the impact applied to the vehicle using the impact direction. Alternatively, the impact location estimator may detect changes in the impact value to detect a maximum impact force point and may perform Fast Fourier Transform (FFT) of the acceleration signals at the maximum impact force point to estimate the location.

The impact detection system may further include an impact detector which is mounted in front and rear surfaces and a side surface of the vehicle and outputs an electrical signal having electrical characteristics indicating the impact applied to the vehicle to the impact location estimator.

The effective impact determining device may compare the impact value with the impact detection reference value for each location of the vehicle, when the impact value is greater than a predetermined minimum reference value.

According to various aspects of the present invention, an impact detection method may include: determining an impact value corresponding to an impact applied to a vehicle and estimating an impact location to which the impact is applied and comparing the determined impact value with an impact detection reference value for each location of the vehicle, the impact detection reference value corresponding to the estimated impact location, to determine validity of the impact applied to the vehicle.

The determining of the validity of the impact may include first comparing the impact value with a minimum reference value and then comparing the impact value with the impact detection reference value for each location of the vehicle, when the impact value is greater than the minimum reference value.

The determining of the impact value may include detecting acceleration perpendicular to the impact applied to the vehicle and generating acceleration signals and determining a vector sum of the generated acceleration signals.

The estimating of the impact location may include detecting an impact direction corresponding to a maximum impact force point on a 3D coordinate system for the acceleration signals and estimating the location of the impact applied to the vehicle using the impact direction. Alternatively, the estimating of the impact location may include detecting changes in the impact value to detect a maximum impact force point and performing FFT of the acceleration signals at the maximum impact force point to estimate the impact location.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Figure 1:
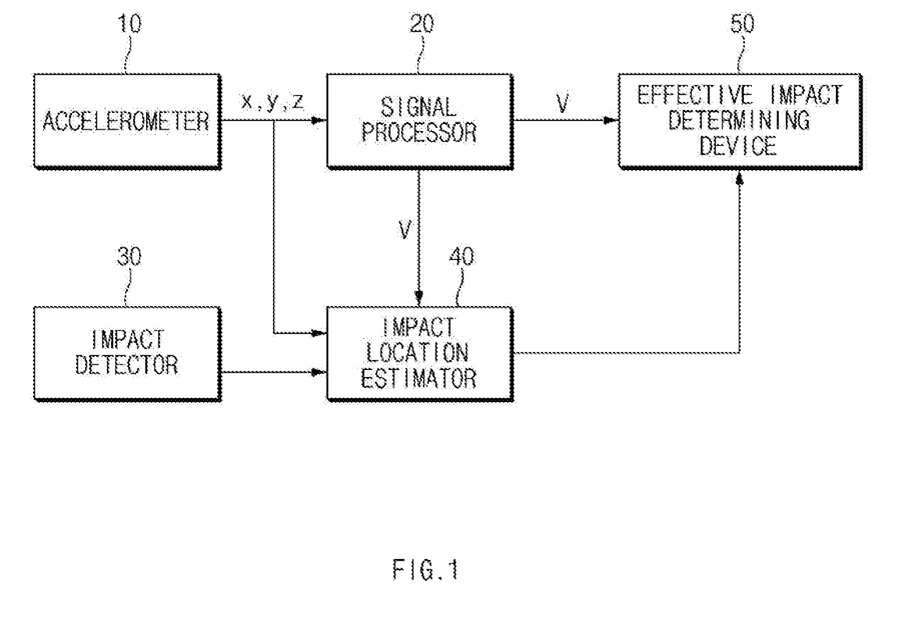
FIG. 1 is a block diagram schematically illustrating a configuration of an impact detection system for a vehicle according to an exemplary embodiment of the present invention.
Figure 2:
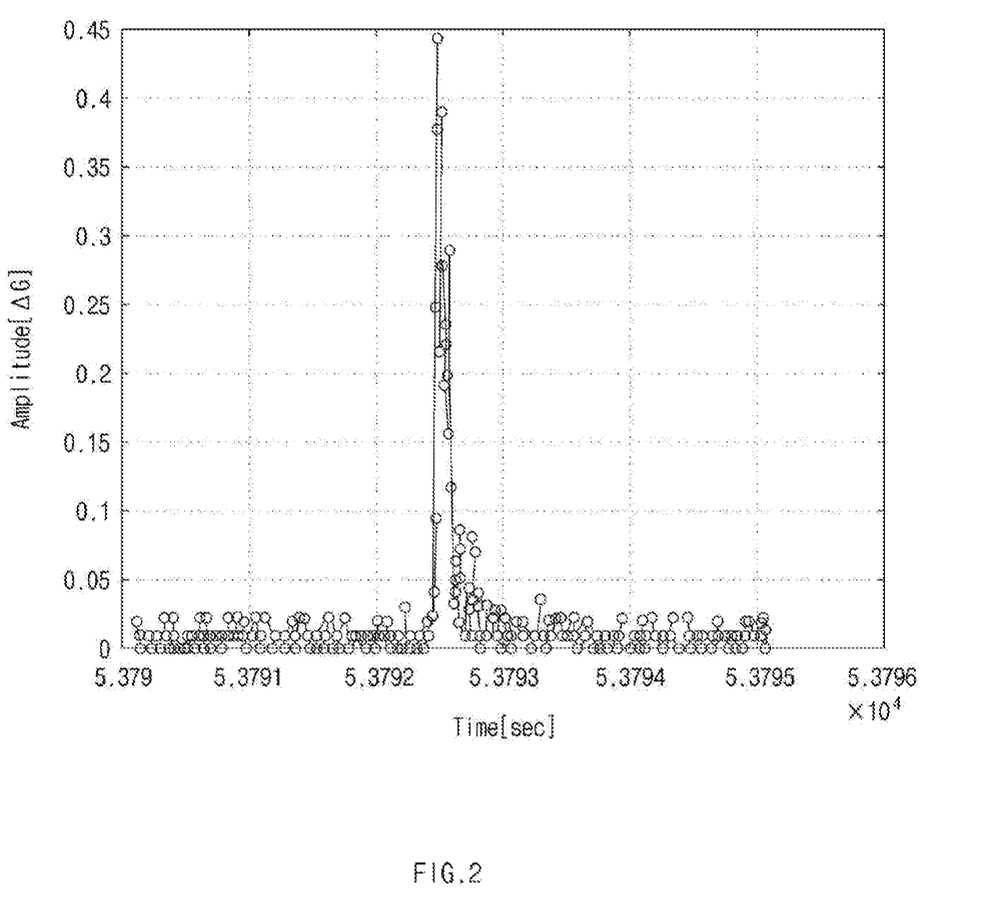
FIG. 2 is a graph illustrating changes in impact values measured by an accelerometer of FIG. 1.

FIG. 1 is a block diagram schematically illustrating a configuration of an impact detection system for a vehicle according to an exemplary embodiment of the present invention. FIG. 2 is a graph illustrating changes in impact values measured by an accelerometer of FIG. 1.

Referring to FIG. 1, the impact detection system may include an accelerometer 10, a signal processor 20, an impact detector 30, an impact location estimator 40, and an effective impact determining device 50.

The accelerometer 10 may be fixed at a specific location of the vehicle. When an impact is applied from the outside to the vehicle, the accelerometer 10 may detect acceleration perpendicular to the impact and may generate acceleration signals x, y, and z corresponding to the acceleration. For example, the accelerometer 10 may detect changes in movement in three axis directions (an X-axis direction, a Y-axis direction, and a Z-axis direction) of the vehicle and may generate the acceleration signals x, y, and z for each axis. Such an accelerometer 10 may be a three-axis accelerometer including three sensors which detect three-axis acceleration. The acceleration signals x, y, and z generated by the accelerometer 10 may be output to the signal processor 20.

The signal processor 20 may process the acceleration signals x, y, and z received from the accelerometer 10 and may determine an impact value V. For example, the signal processor 20 may determine a vector sum $V=\sqrt{x^2+y^2+z^2}$ for the acceleration signals x, y, and z input from the accelerometer 10 and may output the determined value to the effective impact determining device 50 and the impact location estimator 40.

The impact detector 30 may detect an impact applied to the vehicle and may generate a signal (an impact signal) corresponding to the impact to output the generated signal to the impact location estimator 40. Such an impact detector 30 may include various sensors (e.g., a piezoelectric sensor, a vibration sensor, and the like), which are mounted in front and rear surfaces and a side surface of the vehicle, each of which outputs an electrical signal having electrical characteristics (e.g., a frequency, an amplitude, and the like) indicating an impact applied to the vehicle. Alternatively, the impact detector 30 may include a multi-channel camera, a microphone, and the like, which are mounted in the vehicle.

The impact location estimator 40 may estimate a location of the impact applied to the vehicle using the acceleration signals x, y, and z from the accelerometer 10 and the impact value V from the signal processor 20 or the impact signal from the impact detector 30 and may generate an impact location signal including a parameter value indicating the estimated impact location to deliver the generated impact location signal to the effective impact determining device 50.

For example, as shown in FIG. 2, the impact location estimator 40 may receive the impact value V from the signal processor 20 and may monitor changes in the impact value V to detect a maximum impact force point. In the instant case, the maximum impact force point may refer to a time when the impact value V becomes a maximum change value. Each point in FIG. 2 indicates an impact value V for changed acceleration signals. A time when a length between points becomes the longest length may be the maximum impact force point. The impact location estimator 40 may perform Fast Fourier Transform (FFT) of acceleration signals at the maximum impact force point to estimate an impact applied to the vehicle.

Figure 3:
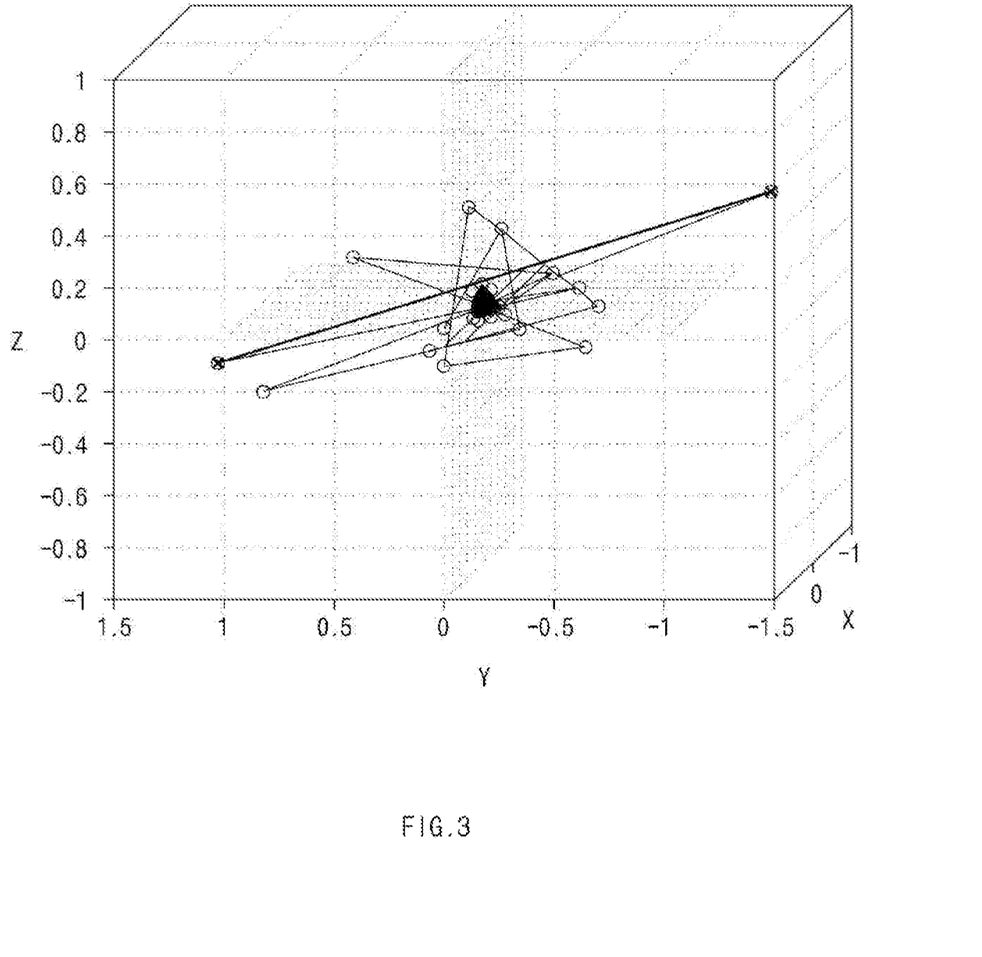
FIG. 3 is a graph illustrating acceleration signals from an accelerometer of FIG. 1 on a three-dimensional (3D) coordinate system.

Alternatively, the impact location estimator 40 may estimate an impact location using a 3D coordinate system for the acceleration signals x, y, and z from the accelerometer 10. FIG. 3 is a graph illustrating acceleration signals from an accelerometer of FIG. 1 on a 3D coordinate system. As shown in FIG. 3, the impact location estimator 40 may generate a 3D coordinate system for the acceleration signals X, Y, and Z, may detect an impact direction corresponding to the maximum impact force point on the 3D coordinate system, and may estimate a location of an impact applied to the vehicle using the impact direction. Each point in FIG. 3 indicates a 3D coordinate value of acceleration signals x, y, and z, and a line connected between points indicates an impact direction. The line of the longest length among such lines indicates an impact direction corresponding to the maximum impact force point. In the instant case, after the line indicating the impact direction at the maximum impact force point is extended, when the extended line is horizontally moved and when a location where the accelerometer 10 is mounted and a vehicle body meet the extended line, a location of the impact applied to the vehicle may be known.

Alternatively, the impact location estimator 40 may estimate a location of the impact using the impact signal from the impact detector 30.

Because an exemplary embodiment of the present invention does not have characteristics of estimating (specifying) the location of the impact applied to the vehicle, it is safe for the method for estimating the location of the impact to be any existing method other than the above-mentioned embodiments.

The effective impact determining device 50 may determine whether the impact applied to the vehicle is an effective impact, using the impact value V from the signal processor 20, the impact location signal from the impact location estimator 40, and a predetermined impact detection reference value for each location. For example, when the impact value V from the signal processor 40 is greater than or equal to a predetermined reference value, the effective impact determining device 50 may compare a parameter value included in the impact location signal received from the impact location estimator 40 with information stored in a memory to detect an impact detection reference value corresponding to the impact location. The effective impact determining device 50 may compare the detected impact detection reference value with the impact value V from the signal processor 20 to determine whether the impact value corresponds to an effective impact. In the instant case, when the impact value is greater than the impact detection reference value, the effective impact determining device 50 may determine the impact as the effective impact.

To this end, a vehicle body may be divided into several regions in advance according to its location, and an impact detection reference value corresponding to a corresponding region may be preset for each region. In the instant case, an impact detection reference value for each location may be differently set according to a distance between each region and the accelerometer 10 (or a length of a path where an impact is delivered), the quality of the material on the path, and the like. Such an impact detection reference value for each location may be preset by a learning process of applying an impact of the same magnitude to each region of the vehicle and analyzing a relationship between impact values detected by the accelerometer 10 with respect to each region. A unique parameter value may be assigned to each region divided according to the location of the vehicle body, and the impact detection reference value for each location may be matched with a parameter value of a corresponding region to be stored in the memory in the effective impact determining device 50 in advance.

Figure 4:
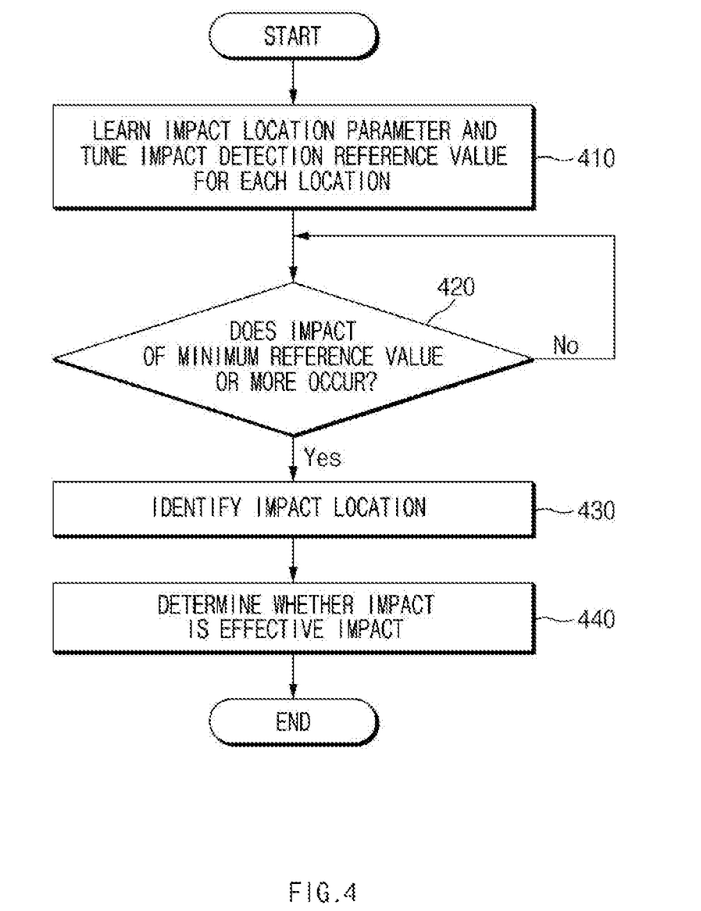
FIG. 4 is a flowchart illustrating an impact detection method according to an exemplary embodiment of the present invention.
Figure 5:
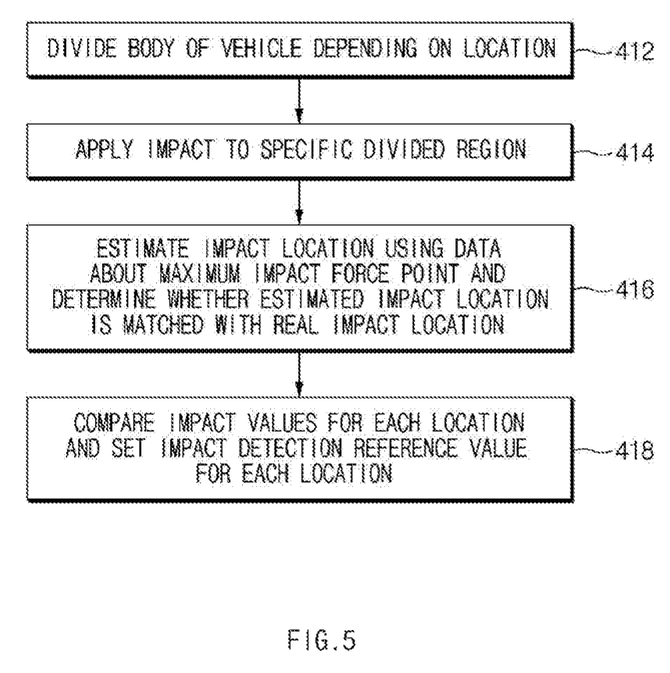
FIG. 5 is a detailed flowchart illustrating a process of learning an impact location parameter and tuning an impact detection reference value for each location according to an exemplary embodiment of the present invention.

FIG. 4 is a flowchart illustrating an impact detection method according to an exemplary embodiment of the present invention. FIG. 5 is a detailed flowchart illustrating a process of learning an impact location parameter and tuning an impact detection reference value for each location according to an exemplary embodiment of the present invention.

Referring to FIG. 4 and FIG. 5, first of all, in operation 410, a process of learning an impact location parameter and tuning an impact detection reference value for each location is performed to determine whether to assign any impact detection reference value for each location of an impact applied to a vehicle body.

Such a process may be performed through a process in FIG. 5 in an initial development stage of the vehicle.

First of all, in operation 412, the vehicle body may be divided into several regions according to its location.

A unique identification value (a unique parameter value) for identifying a corresponding region may be assigned to each of the divided regions.

In operation 414, an impact for test may be applied to a specific region among the divided regions.

When the impact for test is applied, an impact location estimator 40 of FIG. 1 may determine a maximum impact point using the above-mentioned method and may estimate an impact location using data about the maximum impact point. In operation 416, a designer may determine whether the estimated location is matched with a real impact location.

Operations 412 and 414 may be performed for all the regions and may be repeated a predetermined number of times for respective regions to ensure reliability of data.

In operation 418, when the learning of the impact location is competed, while an impact of the same magnitude is applied to each divided region, the impact values may be compared with each other to set an impact detection reference value for each location.

For example, while the impact of the same magnitude is applied to each divided region, a vector sum $V=\sqrt{x^2+y^2+z^2}$ for acceleration signals x, y, and z detected by an accelerometer 10 of FIG. 1 may be determined to obtain an impact value V at a maximum impact force point. In the instant case, although magnitudes of real impacts applied to each region are the same as each other, magnitudes of impacts detected by the accelerometer 10 may differ from each other depending on locations to which the impacts are applied. For example, a magnitude of an impact actually delivered to the accelerometer 10 (levels of acceleration signals) may be varied according to a length of a path where the applied impact is delivered to the accelerometer 10, materials of the vehicle body on the path, and the like.

Thus, impact values determined using the accelerometer 10 may be compared and analyzed for each location, and a reference value (an impact detection reference value), which may be detected the same as an impact of the same magnitude applied from the outside thereof without a difference according to a location of the vehicle body by the accelerometer 10, may be determined for each location.

The determined impact detection reference value for each location may be matched with a parameter value indicating a corresponding region to be stored in a memory. Such a memory may be mounted in an effective impact determining device 50 of FIG. 1.

Through the above-mentioned process in FIG. 5, after a vehicle provided with an impact detection system having a predetermined impact detection reference value for each location is released, when an impact is applied to the vehicle, in operation 420, the impact detection system may determine whether the impact is greater than a predetermined minimum reference value irrespective of a location to which the impact is applied.

For example, when an impact is applied to the vehicle, the accelerometer 10 may detect acceleration perpendicular to the impact and may generate acceleration signals x, y, and z corresponding to the acceleration to deliver the generated acceleration signals x, y, and z to a signal processor 20 of FIG. 1. The signal processor 20 may determine a vector sum of the acceleration signals x, y, and z input from the accelerometer 10 as an impact value V and may deliver the impact value V to an effective impact determining device 50 of FIG. 1. The effective impact determining device 50 may compare the impact value V with a minimum reference value.

While the operation of the effective impact determining device 50 is performed, an impact location estimator 40 of FIG. 1 may estimate an impact location to which the impact is applied and may generate an impact location signal including a parameter value indicating the estimated location to deliver the generated impact location signal to the effective impact determining device 50.

When the impact value V is less than the minimum reference value, the effective impact determining device 50 may ignore the impact applied to the vehicle. On the other hand, when the impact value V is greater than or equal to the minimum reference value, in operation 430, the effective impact determining device 50 may determine whether the impact is an impact applied to any location of the vehicle.

For example, the effective impact determining device 50 may extract a parameter value indicating an impact location from the impact location signal received from the impact location estimator 40.

In operation 440, the effective impact determining device 50 may determine whether the impact corresponds to an effective impact using the parameter value indicating the impact location.

For example, the effective impact determining device 50 may compare the parameter value indicating the impact location with information stored in the memory to detect an impact detection reference value for a corresponding region and may compare the impact detection reference value with the impact value V to determine whether the impact corresponds to the effective impact.

When the impact value V is greater than or equal to the impact detection reference value, the effective impact determining device 50 may determine the impact as the effective impact.

When it is determined that the impact is the effective impact, the effective impact determining device 50 may output an operation signal for proceeding with a subsequent operation.

For example, when the impact detection system is applied to an image recording system, and when an operation signal for providing a notification that a corresponding impact is an effective impact is output from the effective impact determining device 50, the image recording system may store an image from a certain time before the impact is applied to a certain time after the impact is applied as a separate file name. In the instant case, the file name of the image may include information related to the location to which the impact is applied.

An exemplary embodiment of the present invention may differentially apply an impact detection reference value corresponding to a location of an impact depending on the location of the impact applied to a vehicle and may optimize a detection deviation according to the location of the impact, thus more accurately determining the validity of the impact applied to the impact applied to the vehicle.

Hereinabove, although the present invention has been described with reference to exemplary embodiments and the accompanying drawings, the present invention is not limited thereto, but may be variously modified and altered by those skilled in the art to which an exemplary embodiment of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An impact detection system for a vehicle, the system comprising:
   an accelerometer configured to generate acceleration signals;
   an impact value calculating device configured to determine an impact value corresponding to a magnitude of an impact applied to the vehicle from outside;
   an impact location estimating device configured to estimate an impact location to which the impact is applied in the vehicle and to generate an impact location signal including a parameter value corresponding to the estimated impact location using the acceleration signals from the accelerometer; and
   an effective impact determining device configured to compare the determined impact value with an impact detection reference value corresponding to the estimated impact location to determine whether the impact is an effective impact, and output an operation signal for controlling a device in the vehicle,
   wherein the effective impact determining device is configured to determine the impact detection reference value corresponding to the impact location by comparing the parameter value included in the impact location signal with information about an impact detection reference value for each location of the vehicle matched with a parameter value of a corresponding region stored in a memory, and
   wherein the region is classified to identify the impact location according to the impact location of the vehicle, and
   wherein the impact detection reference value is differently set corresponding to the region,
   wherein the impact detection reference value and the region are matched one-to-one, and
   wherein the impact detection reference value for each location is set based on a distance between each location and the accelerometer included in the impact value calculating device, a length of a path where an impact is delivered from each location to the accelerometer, and quality of material on the path where the impact is delivered.

2. The system of claim 1, wherein the impact value calculating device includes:

the accelerometer configured to detect acceleration perpendicular to the impact applied to the vehicle and to generate the acceleration signals; and a signal processor connected to the accelerometer and configured to determine and output a vector sum of the acceleration signals as the determined impact value.

3. The system of claim 2, wherein the impact location estimating device is configured to detect an impact direction corresponding to a maximum impact force point on a three-dimensional (3D) coordinate system for the acceleration signals and estimates the impact location to which the impact is applied to the vehicle by use of the impact direction.

4. The system of claim 2, wherein the impact location estimating device is configured to detect changes in the impact value to detect a maximum impact force point and is configured to perform Fast Fourier Transform (FFT) of the acceleration signals at the maximum impact force point to estimate the impact location.

5. The system of claim 1, further including:

an impact detector mounted in front and rear surfaces and a side surface of the vehicle and configured to output an electrical signal having electrical characteristics indicating the impact applied to the vehicle to the impact location estimating device.

6. The system of claim 1, wherein the effective impact determining device is configured to compare the impact value with the impact detection reference value for each location of the vehicle, when the impact value is greater than a predetermined minimum reference value.

7. The system of claim 6, wherein, when the impact value is greater than or equal to the impact detection reference value, the effective impact determining device is configured to conclude the impact as the effective impact and outputs the operation signal.

* * * * *